(12) United States Patent
Rahn

(10) Patent No.: US 9,407,375 B2
(45) Date of Patent: Aug. 2, 2016

(54) OPTICAL TRANSFER LINEARITY USING TEST TONES

(71) Applicant: Infinera Corporation, Sunnyvale, CA (US)

(72) Inventor: Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 149 days.

(21) Appl. No.: 14/042,284

(22) Filed: Sep. 30, 2013

(65) Prior Publication Data

US 2015/0093117 A1 Apr. 2, 2015

(51) Int. Cl.
*H04B 10/588* (2013.01)

(52) U.S. Cl.
CPC .................... *H04B 10/588* (2013.01)

(58) Field of Classification Search
CPC .............................. H04B 10/58; H04B 10/588
See application file for complete search history.

(56) References Cited

U.S. PATENT DOCUMENTS

| | | | |
|---|---|---|---|
| 7,426,350 B1 * | 9/2008 | Sun et al. ....................... | 398/193 |
| 2002/0171894 A1 * | 11/2002 | Sun ................................. | 359/161 |
| 2006/0127104 A1 * | 6/2006 | Harley et al. .................. | 398/198 |
| 2007/0165294 A1 * | 7/2007 | Witzel ........................... | 359/245 |
| 2013/0170831 A1 | 7/2013 | Rahn | |
| 2015/0023659 A1 * | 1/2015 | Sun et al. ....................... | 398/34 |

OTHER PUBLICATIONS

"Mach-Zehnder interferometer," Wikipedia, the free encyclopedia, Sep. 6, 2013, En.wikipedia.org/wiki/Mach-Zehnder_interferometer, pp. 1-7.
"Optical Transmitters," Broadband Circuits for Optical Fiber Communication, Eduard Säckinger, 2005, pp. 233-257.

* cited by examiner

*Primary Examiner* — Nathan Curs
(74) *Attorney, Agent, or Firm* — Harrity & Harrity LLP; David L. Soltz

(57) ABSTRACT

An optical system may have an optical transmitter including a digital signal processor to receive a signal channel, determine a digital signal associated with the signal channel based on information in a look-up table and based on a test tone, and output the digital signal. The optical system may further have a digital-to-analog converter to convert the digital signal to an analog signal, a laser to provide an optical signal, and a modulator to receive the optical signal and the analog signal, and modulate the optical signal based on the analog signal to form a modulated optical signal. The optical system may also have a photodiode to convert the modulated optical signal to a digital signal, a tone detector to detect the test tone based on the digital signal, and a controller to modify the information in the look-up table based on the test tone.

20 Claims, 9 Drawing Sheets

OPTICAL TRANSFER LINEARITY USING TEST TONES

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component that includes a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. A Tx PIC may include a polarization beam combiner (PBC) to combine two optical signals into a composite DP signal. In some implementations, one or more electrical signals provided to the Tx PIC may be implemented on an application-specific integrated circuit (ASIC), such as a digital signal processor (DSP), a digital-to-analog converter (DAC), or the like.

A WDM system may also include a receiver circuit having a receiver (Rx) PIC. The Rx PIC may include a polarization beam splitter (PBS) to receive an optical signal (e.g., a WDM signal), split the received optical signal, and provide two optical signals (e.g., associated with orthogonal polarizations) associated with the received optical signal. The Rx PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

The Tx PIC may generate an optical signal (e.g., a response) based on an input signal (e.g., a client signal). In some instances, the optical signal may not be directly proportional to the input signal (e.g., the response may be nonlinear). A linear response may occur when the power of the output signal remains proportional to the input signal regardless of the input voltage used to drive the modulator.

SUMMARY

According to one example implementation, an optical system may have an optical transmitter including a digital signal processor (DSP) to receive a signal channel, determine a digital signal associated with the signal channel based on information in a look-up table and based on a test tone, and output the digital signal. The optical system may further have a digital-to-analog converter (DAC) to convert the digital signal to an analog signal, a laser to provide an optical signal, and a modulator to receive the optical signal and the analog signal, and modulate the optical signal based on the analog signal to form a modulated optical signal. The optical system may also have a photodiode to convert the modulated optical signal to a digital signal, a tone detector to detect the test tone based on the digital signal, and a controller to modify the information in the look-up table based on the test tone.

According to another example implementation, an optical system may have an optical transmitter including a DSP to receive a signal channel, determine an output voltage, associated with the signal channel, based on information in a look-up table, determine a first digital signal by modifying the output voltage based on a test tone, and output the first digital signal. The optical system may further have a DAC to convert the first digital signal to an analog signal, a laser to provide an optical signal, a modulator to receive the optical signal and the analog signal and modulate the optical signal based on the analog signal to form a modulated optical signal. The optical system may also have a photodiode to convert the modulated optical signal to a second digital signal, a tone detector to detect the test tone based on the second digital signal, and a controller to modify the look-up table based on the test tone.

According to another example implementation, an optical system may have an optical transmitter including a DSP to receive a client signal, determine a first digital signal associated with the client signal based on a look-up table and based on a test tone, and output the first digital signal. The optical system may further have a DAC to convert the first digital signal to an analog signal, a laser to provide an optical signal, and a Mach-Zehnder modulator (MZM) to receive the optical signal and the analog signal, and modulate the optical signal based on the analog signal to form a modulated optical signal. The modulated optical signal may be a nonlinear signal. The optical system may also have a photodiode to convert the modulated optical signal to a second digital signal, a tone detector to detect the test tone based on the second digital signal, and a controller to modify the look-up table, based on the test tone, to cause the modulated optical signal, output by the MZM, to be a substantially linear signal.

BRIEF DESCRIPTION OF THE DRAWINGS

The accompanying drawings, which are incorporated in and constitute part of this specification, illustrate one or more implementations described herein and, together with the description, explain these implementations. In the drawings.

DETAILED DESCRIPTION

The following detailed description of example implementations refers to the accompanying drawings. The same reference numbers in different drawings may identify the same or similar elements. Also, the following detailed description does not limit the disclosure.

An optical transmitter may employ a digital-to-analog converter (DAC) to define a spectrum of the transmitted signal. Use of the DAC may permit higher-order modulation, and/or an increased spectral efficiency of the transmitted signal by the use of spectral shaping. Such higher-order modulation, and/or spectral shaping may depend on a transmitted signal that is linear with respect to an input signal (e.g., that is linearly proportional to the input signal). However, some components of the optical transmitter, such as a Mach-Zehnder Modulator (MZM), may introduce a nonlinear response to the transmitted signal (e.g., may provide an output signal that is not linearly proportional to the input signal). For example, a plot of the electrical field magnitude output by the MZM with respect to an input signal (e.g., an input voltage) may be directly proportional if the response is linear, and may be a nonlinear function if the response is nonlinear.

To compensate for the nonlinear output signal associated with the MZM, the optical transmitter may modify the input signal based on a look-up table. The look-up table may permit the optical transmitter to increase and/or decrease the input signal such that the output of the MZM is linear (e.g., that the electric field magnitude output is directly proportional to a desired value). However, the look-up table may not fully compensate for the nonlinear response due to changes in the MZM (e.g., changes in a temperature associated with the MZM, changes in the MZM due to operating the MZM for a period of time, etc.). Implementations described herein may permit an optical transmitter to compensate for the nonlinear output of an MZM by using a set of test tones to modify the look-up table.

Figure 1A:
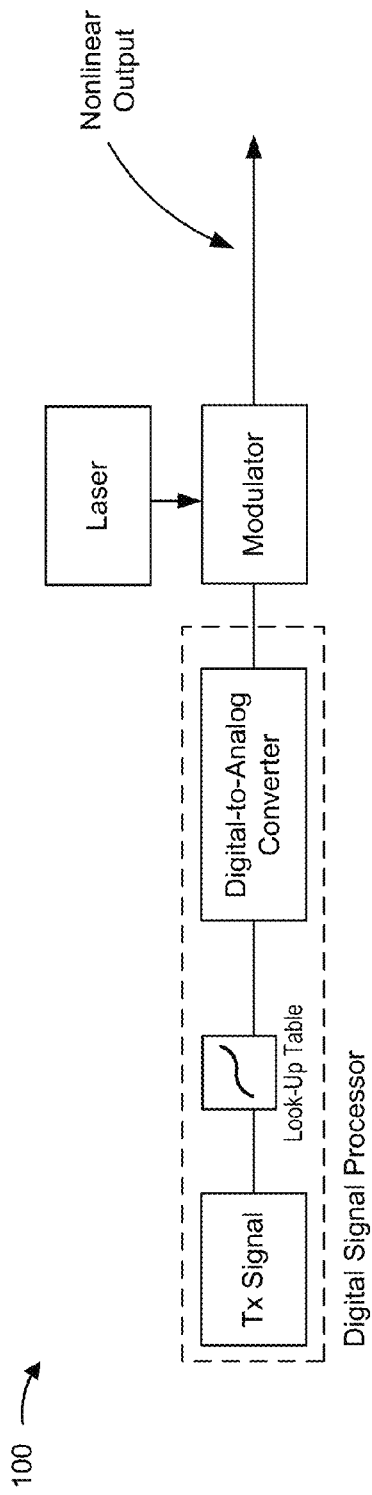
FIGS. 1A-1B are diagrams illustrating an overview of an example implementation described herein.
Figure 1B:
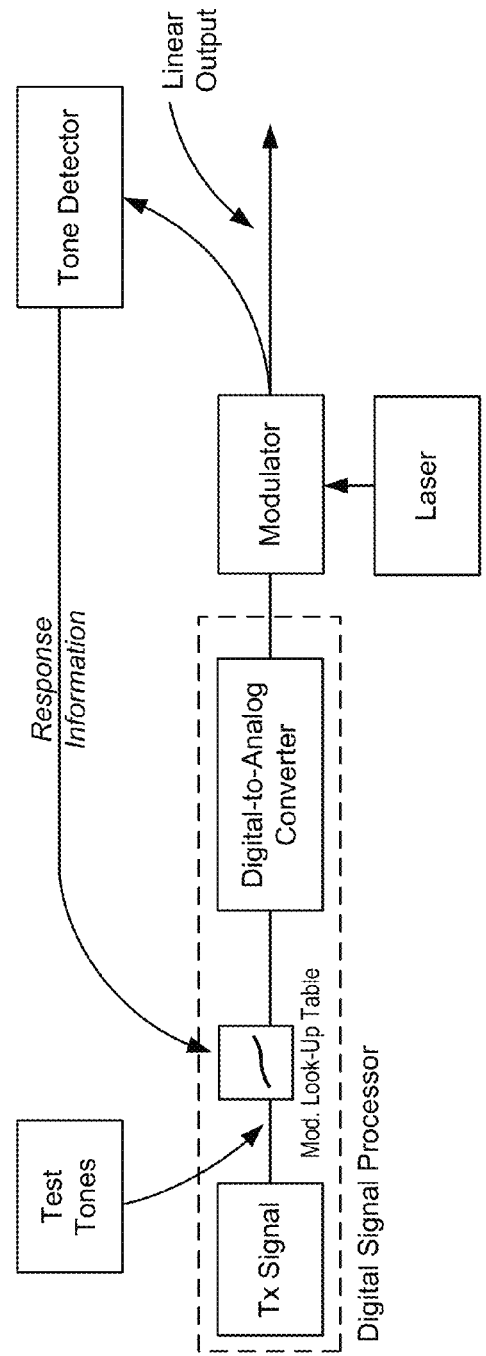

FIGS. 1A-1B are diagrams illustrating an overview of an example implementation described herein. As shown in FIG. 1A, the optical communication system may include a digital signal processor (DSP) implemented on an ASIC, along with a digital-to-analog converter (DAC). The DSP may receive an input signal (e.g., "Tx Signal"), and may modify the input signal based on a look-up table. The DAC may convert the signal (e.g., the input signal modified by the look-up table) to an analog signal, and may provide the analog signal to a modulator. The modulator may modulate the intensity and phase of an optical input (e.g., supplied by a laser) based on the analog signal received from the DAC, and may provide the modulated signal. Because the look-up table may not fully correct for the nonlinear output of the modulator, the modulated signal may be nonlinear.

As shown in FIG. 1B, the DSP may generate a set of test tones. A tone detector may detect the test tones, and may measure the power of the modulated signal (e.g., a response) with respect to a set of amplitudes associated with the test tones. The tone detector may determine response information associated with the test tones (e.g., how the modulated signal responds to the set of test tones). Based on the response information, the DSP may modify the look-up table to cause the modulator to provide a linear output (e.g., an output signal power that is linearly proportional to the input signal).

Figure 2:
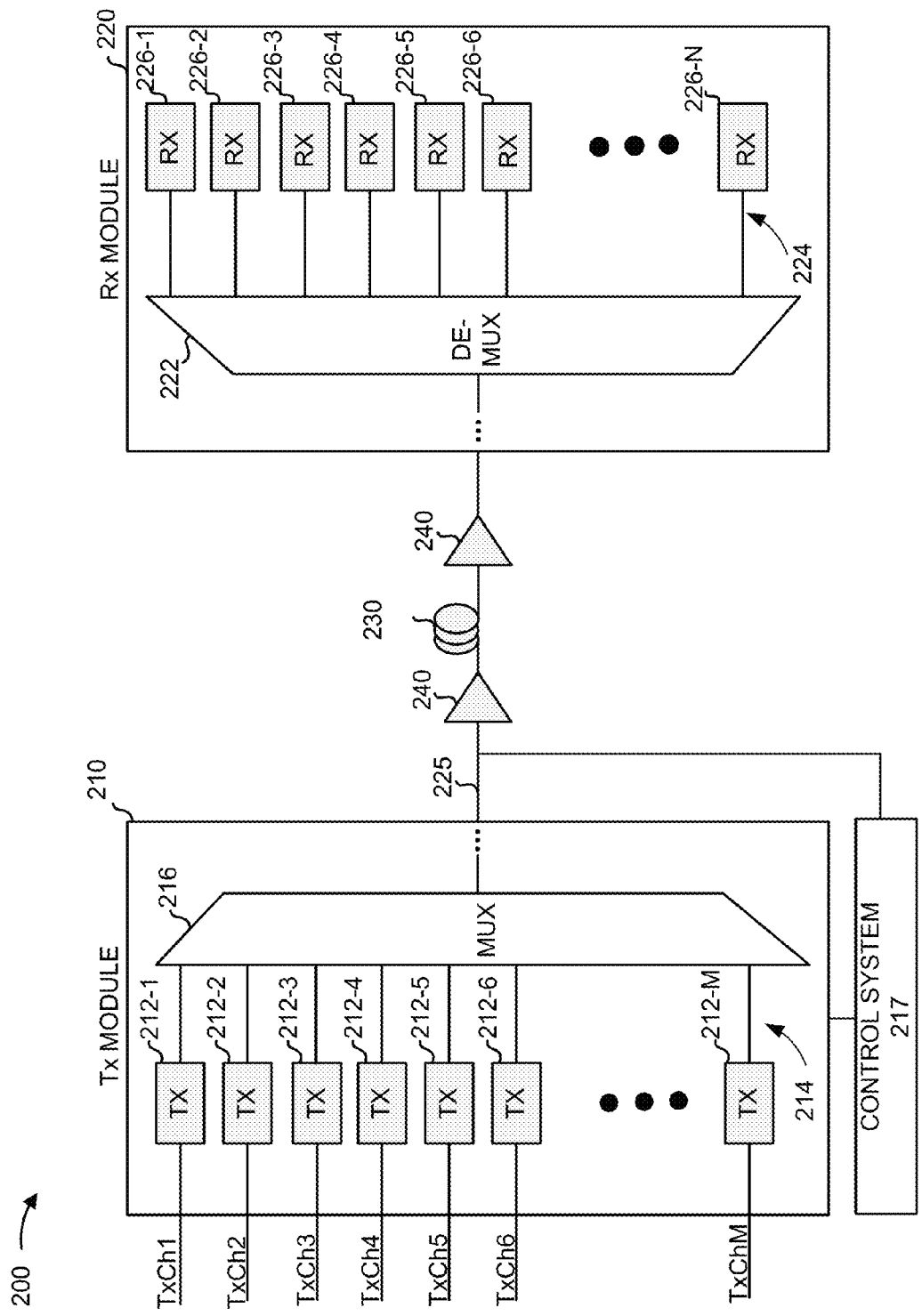
FIG. 2 is a diagram of an example network in which systems and/or methods described herein may be implemented.

FIG. 2 is a diagram of an example network 200 in which systems and/or methods described herein may be implemented. As illustrated in FIG. 2, network 200 may include transmitter (Tx) module 210 (e.g., a Tx PIC), control system 217, and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include a number of optical transmitters 212-1 through 212-M (where M≥1), waveguides 214, and/or optical multiplexer 216. In some implementations, transmitter module 210 may include additional components, fewer components, different components, or differently arranged components. For example, in some implementations, transmitter module 210 may include control system 217.

Each optical transmitter 212 may receive data for a data channel (shown as TxCh1 through TxChM), create multiple subcarriers for the data channel, map data, for the data channel, to the multiple subcarriers, modulate the data with an optical signal to create a multiple subcarrier output optical signal, and transmit the multiple subcarrier output optical signal. In one implementation, transmitter module 210 may include 1, 5, 10, 20, 50, 100, or some other quantity of optical transmitters 212. Each optical transmitter 212 may be tuned to use an optical carrier of a designated wavelength. Each optical transmitter 212 may modulate signals over a single optical polarization, or over multiple optical polarizations (e.g., an X polarization and a Y polarization). It may be desirable that the grid of wavelengths emitted by optical transmitters 212 conform to a known standard, such as a standard published by the Telecommunication Standardization Sector (ITU-T). It may also be desirable that the grid of wavelengths be flexible and tightly packed to create a super channel.

In some implementations, each of optical transmitters 212 may include a TX DSP, a digital-to-analog converter (DAC), a laser, a modulator, and/or some other components. In some implementations, the DAC may be associated with the TX DSP as part of an application-specific integrated circuit (ASIC). The laser and/or the modulator may be coupled with a tuning element that can be used to tune the wavelength of the optical signal channel.

Waveguides 214 may include an optical link or some other link to transmit output optical signals of optical transmitters 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other multiplexing device. In some implementations, optical multiplexer 216 may combine multiple signal channels, associated with optical transmitters 216, into a wave division multiplexed (WDM) signal, such as WDM signal 225. In some implementations, which use two polarizations, the two polarizations may be combined prior to entering optical multiplexer 216. In some implementations, which use two polarizations, the two polarizations may be combined after passing through separate optical multiplexers 216.

In some implementations, WDM signal 225 can be formed via multiple groups of optical transmitters 212. For example, a first transmitter module 210 may include a number of optical transmitters 212 to provide a corresponding number of optical signals. A second transmitter module 210 may include a number of transmitters 212 to provide a corresponding number of additional optical signals. An adding circuit may be provided to add the optical signals provided by the first and second transmitter modules 210 to form WDM signal 225. In some implementations, WDM signal 225 may correspond to a single super channel having multiple carriers associated with multiple optical signals provided by optical transmitters 212.

Control system 217 may include components to determine a frequency error associated with an optical signal provided by optical transmitter 212 and/or associated with WDM signal 225. For example, control system 217 may include a controller, a photodetector, a multiplier circuit, an oscillator circuit, a low-pass filter (LPF) and/or an error calculation circuit. In some implementations, control system 217 may provide a signal to optical transmitters to 212 to adjust components of optical transmitters 212 (e.g., a heater, a frequency control port, a laser control port, etc.) to modify a frequency of an optical signal provided by a laser of optical transmitter 212 (e.g., to adjust a frequency error and to adjust inter-carrier gap to a desired spacing). In some implementations, a particular control system 217 may be associated with a particular WDM signal 225 (e.g., an optical signal having a single super channel with multiple carriers). Thus, in an implementation having multiple super channels, multiple control systems 217 may be provided (e.g., one control system 217 for each super channel).

Link 230 may include an optical fiber. Link 230 may transport one or more optical signals associated with multiple wavelengths. Amplifier 240 may include an amplification device, such as a doped fiber amplifier or a Raman amplifier. Amplifier 240 may amplify the optical signals as the optical signals are transmitted via link 230.

Receiver module 220 may include optical demultiplexer 222, waveguides 224, and/or optical receivers 226-1 through 226-N (where N≥1). In some implementations, receiver module 220 may include additional components, fewer components, different components, or differently arranged components.

Optical demultiplexer 222 may include an AWG or some other device. Optical demultiplexer 222 may supply multiple signal channels based on a received WDM signal (e.g., WDM signal 225). As shown in FIG. 2, optical demultiplexer 222 may supply signal channels to optical receivers 226 via waveguides 224. In some implementations, the signal may be separated into two polarizations before passing through independent optical demultiplexers 222. In some implementation, the signal may be separated into two polarizations after passing through optical demultiplexer 222.

Waveguides 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receivers 226 may each include one or more photodetectors and related devices to receive respective input optical signals outputted by optical demultiplexer 222, detect the subcarriers associated with the input optical signals, convert data within the subcarriers to voltage signals, convert the voltage signals to digital samples, and process the digital samples to produce output data corresponding to the input optical signals. Optical receivers 226 may each operate to convert the input optical signal to an electrical signal that represents the transmitted data. In some implementations, each of optical receivers 226 may include a local oscillator, a hybrid mixer, a detector, an analog-to-digital converter (ADC), an RX DSP, and/or some other components.

While FIG. 2 shows network 200 as including a particular quantity and arrangement of components, in some implementations, network 200 may include additional components, fewer components, different components, or differently arranged components. Also, in some instances, one of the devices illustrated in FIG. 2 may perform a function described herein as being performed by another one of the devices illustrated in FIG. 2.

Figure 3:
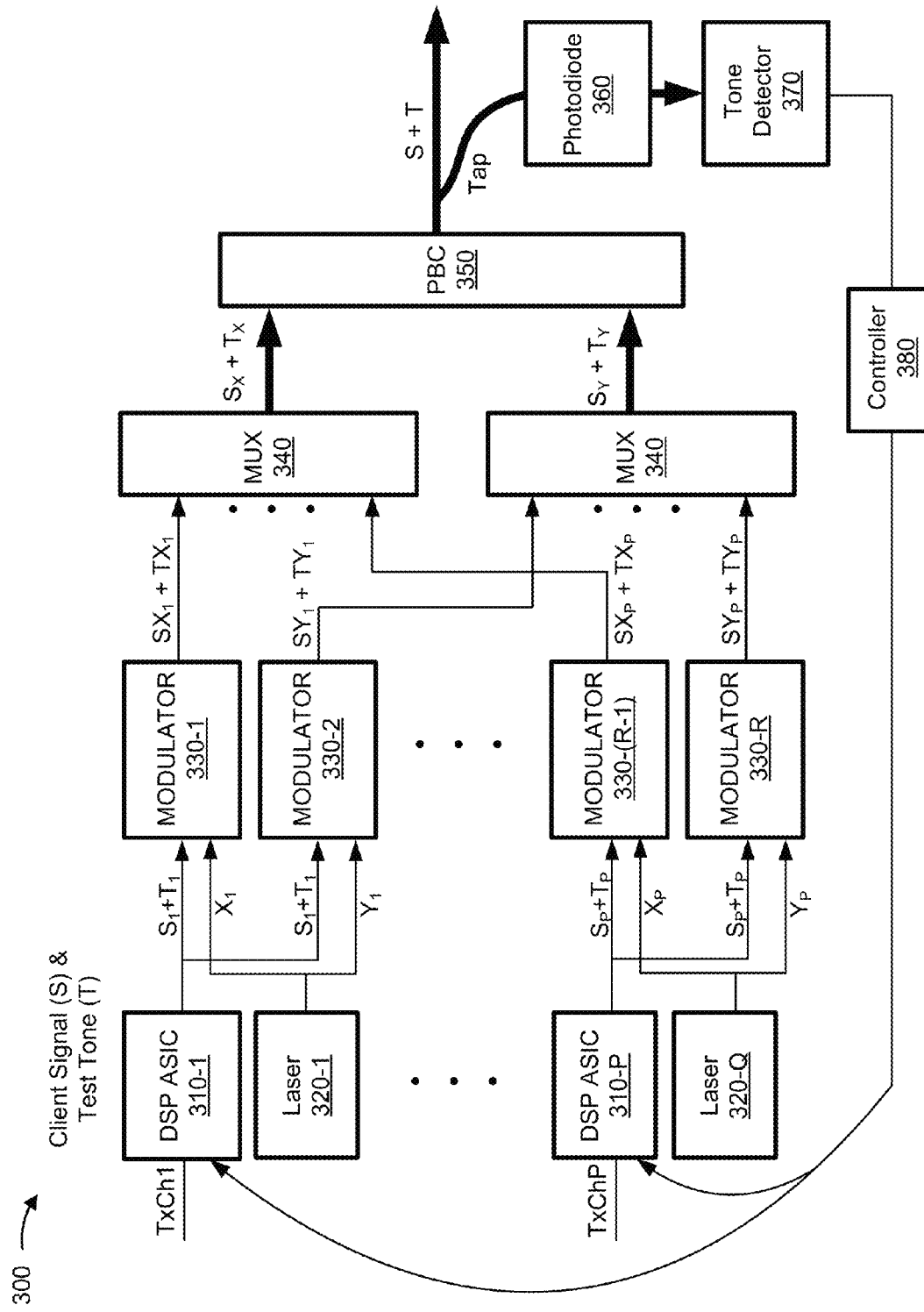
FIG. 3 is a diagram illustrating an example of components of one or more devices of FIG. 2.

FIG. 3 is a diagram of example components of network 200. Network 200 may include a collection of components, such as a group of DSP ASICs 310-1, . . . , 310-P (where P≥1) (hereinafter referred to collectively as "DSP ASIC 310" and individually as "DSP ASIC 310"), a group of lasers 320-1, . . . , 320-Q (where Q≥1) (hereinafter referred to collectively as "lasers 320" and individually as "laser 320"), a group of modulators 330-1, . . . , 330-R (where R≥1) (hereinafter referred to collectively as "modulators 330" and individually as "modulator 330"), a pair of multiplexers (MUXs) 340, a polarization beam splitter (PBC) 350, a photodiode 360, a tone detector 370, and a controller 380. The quantity of components, shown in FIG. 3, is provided for explanatory purposes. In practice, there may be additional components, fewer components, different components, or differently arranged components than shown in FIG. 3.

DSP ASIC 310 may include one or more components that are capable of generating an analog signal (e.g., a voltage signal) that can be outputted to modulator 330 (e.g., shown in FIG. 3 as "S"). In some implementations, DSP ASIC may include a digital-to-analog converter (DAC), and may receive a signal channel (e.g., TxCh1) and process the signal channel to form the analog signal (e.g. via the DAC). DSP ASIC 310 may modify the signal channel based on a look-up table. Further, DSP ASIC 310 may add data, corresponding to a set of test tones, to the signal channel (e.g., shown in FIG. 3 as "T").

Laser 320 may include one or more components that are capable of generating and/or transmitting an optical signal at a particular wavelength and/or with a particular bandwidth, which may be tuned and/or calibrated based on an instruction received, via a control signal, from control system 217. Laser 320 may include a semiconductor laser, such as a distributed feedback (DFB) laser, or some other type of laser. In some implementations, laser 320 may be an optical source for a single corresponding optical transmitter 212. In some implementations, laser 320 may be an optical source that is shared by multiple optical transmitters 212.

In one implementation, each optical transmitter 212 and/or each modulator 330 may be associated with a laser (e.g., a first laser 320-1 associated with a first modulator 330-1, a second laser 320-2 associated with a second modulator 330-2, etc.). Additionally, or alternatively, laser 320 may include a double-sided laser that provides multiple branches of optical light to modulators 330, such as a first branch of optical light to modulator 330-1, a second branch of optical light to second modulator 330-2, and so forth. In some implementations, the first branch of optical light may be associated with a first polarization (e.g., the X polarization shown in FIG. 3 as "X") and the second branch of optical light may be associated with a second polarization (e.g., the Y polarization shown in FIG. 3 as "Y").

Modulator 330 may include one or more components capable of modulating the intensity and phase of an input optical light (e.g., supplied by laser 320), based on input voltage signals (e.g., corresponding to signal channels provided by DSP ASIC 310), and providing a modulated signal channel. Modulator 330 may include a Mach-Zehnder modulator (MZM), an electro-absorption modulator (EAM), or some other type of modulator. Modulator 330 may be formed as a waveguide with electrodes for applying an electric field, based on the input voltage signal, in a direction perpendicular to the light. Alternatively, modulator 330 may be implemented based on other modulation technologies, such as electro-optic modulation. In some implementations, the modulated signal channel may include data, associated with an input channel received by DSP ASIC 310, and may include the test tones. In some implementations, optical transmitter 212 may include multiple modulators 330 (e.g., modulator 330-1 and modulator 330-2).

In some implementations, modulator 330 may modulate a first component of the optical signal (e.g., received from laser 320), associated with a first polarization (e.g., the X polarization), to create a modulated optical signal (e.g., shown in FIG. 3 as "SX") associated with the first polarization. Modulator 330 may modulate the optical signal using phase modulation techniques (e.g., based on QPSK and/or another phase modulation technique) so that the modulated optical signal includes a collection of phase-modulated symbols. The modulated optical signal may also include the test tones (e.g., shown in FIG. 3 as "TX"). Modulator 330 may output the modulated first component of the optical signal to a first MUX 340. Another modulator 330 may, in the manner described above, modulate a second component of the optical signal (e.g., shown in FIG. 3 as "SY") associated with the second polarization (e.g., the Y polarization), which may include the test tones (e.g., shown in FIG. 3 as "TY"), and may output the modulated second component of the optical signal to a second MUX 340.

MUX 340 may include one or more components to multiplex optical signals received from one or more modulators 330. For example, MUX 340 may multiplex one or more modulated first components (e.g., associated with the X polarization) of optical signals received from modulators 330 (e.g., using WDM techniques) into a single optical signal associated with multiple wavelengths (e.g., shown in FIG. 3 as "$S_X$" and "$T_X$"). Each of the modulated first components may correspond to a respective one of the wavelengths. MUX 340 may output the optical signal to PBC 350. Additionally, or alternatively, another MUX 340 may, as described above, multiplex one or more modulated second components (e.g., associated with the Y polarization) of optical signals received from other modulators 330 and may output another single optical signal to PBC 350 (e.g., shown in FIG. 3 as "$S_Y$" and "$T_Y$").

PBC 350 may include one or more components to combine multiple signals, having components associated with different polarizations, and provide a combined signal (e.g., via link 230). For example, PBC may receive a first optical signal having a first polarization (e.g., the X polarization) from MUX 340, and may receive a second optical signal having a second polarization (e.g., the Y polarization) from another MUX 340. PBC 350 may combine the first optical signal and the second optical signal into a combined optical signal, and may output the combined optical signal into an optical fiber.

Photodiode 360 may include one or more components to convert an optical signal into a digital signal (e.g., a current and/or a voltage). For example, photodiode 350 may receive a portion of the combined optical signal from PBC 350 (e.g., via a tap), and may convert the optical signal into a digital signal. Photodiode 360 may output the digital signal to tone detector 360. In some implementations, photodiode 360 may be associated with modulator 330. For example, modulator 330 may be a modulator that includes photodiode 370.

Tone detector 370 may include one or more components to detect one or more test tones associated with the optical signal received by photodiode 360. For example, tone detector 270 may receive a digital signal from photodiode 260, and may determine the one or more test tones based on the digital signal. For example, tone detector 270 may measure the power output of the optical signal (e.g., a response) as a function of test tone frequency.

Controller 380 may include one or more components to modify the look-up table associated with DSP ASIC 310 based on detecting the test tones. Controller 380 may receive response information (e.g., information that identifies how the optical signal changes in response to the test tones) from tone detector 370. Based on the response information, controller 380 may determine how the look-up table is to be modified to produce a substantially linear output, and may rewrite values associated with the look-up table.

While particular elements of network 200 are shown in FIG. 3, in practice, the example implementations of network 200, shown in FIG. 3, may include additional elements, fewer elements, or differently arranged elements than are shown in FIG. 3. Also, in some instances, one of the components illustrated in FIG. 3 may perform a function described as being performed by another one of the components illustrated in FIG. 3.

Figure 4:
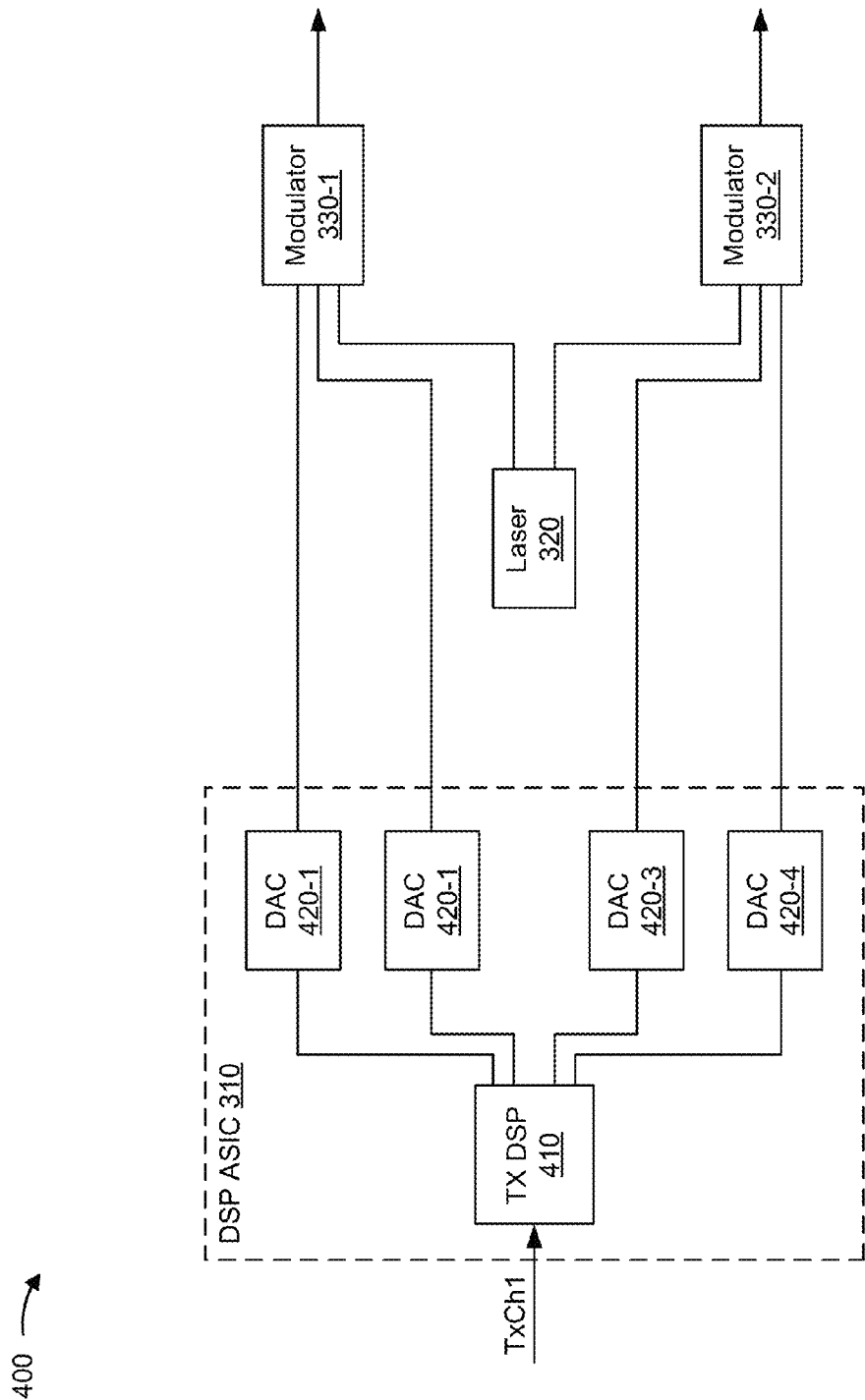
FIG. 4 is a diagram illustrating an example of components of an optical transmitter shown in FIG. 2.

FIG. 4 is a diagram illustrating example elements of optical transmitter 212 shown in FIG. 2. As shown in FIG. 4, optical transmitter 212 may include TX DSP 410, DACs 420, laser 320, and modulators 330.

TX DSP 410 may include a processing device or a collection of processing devices. In some implementations, TX DSP 410 may receive a signal channel (e.g., TxCh1) and process the signal channel to form four sets of digital signals (e.g., a first set of digital signals corresponding to in-phase X polarization optical signals, a second set of digital signals corresponding to quadrature phase (hereinafter "quad-phase") X polarization optical signals, a third set of digital signals corresponding to in-phase Y polarization optical signals, and a fourth set of digital signals corresponding to quad-phase Y polarization optical signals).

In some implementations, TX DSP 410 may modify the signal channel based on a look-up table. For example, TX DSP 410 may assign an output DAC code that is larger or smaller than a desired value, on an assumption that the non-linear behavior of the signal path will have an opposite effect, and the net result will be linear behavior. Furthermore, TX DSP 410 may receive the signal channel and may increase or decrease the signal channel based on values associated with the desired output amplitude. Further, Tex. DSP 410 may determine a set of test tones based on the desired output amplitude. For example, DSP 410 may define a voltage range associated with the look-up channel (e.g., based on voltages identified in the look-up table) and may increase or decrease voltages within the voltage range at a frequency (e.g., a test tone frequency). Thus, the four sets of digital signals may include the set of test tones. As shown in FIG. 4, TX DSP 410 may provide the four sets of digital signals to respective DACs 420.

DACs 420 may include a signal converting device or a collection of signal converting devices. In some implementations DACs 420 may receive respective digital signals from TX DSP 410, convert the received digital signals to analog signals, and provide the analog signals to modulators 330. The analog signals may correspond to electrical signals (e.g., voltages) to drive modulator 330. Based on the electrical signals provided by DACS 420, modulator 330 may modulate the intensity and phase of an input optical light supplied by laser 320, and may provide a modulated optical signal. The modulated optical signal may include data, associated with an input channel received by TX DSP 410, and may include the test tones.

In some implementations, DSP ASIC 310 may output voltage signals to multiple modulators 330 (e.g., modulator 330-1 and modulator 330-2). Modulator 330-1 may be used to modulate signals of the first polarization (e.g., an X polarization). Modulator 330-2 may be used to modulate signals of the second polarization (e.g., a Y polarization). In some implementations, two DACs 420 may be associated with each polarization. In these implementations, DACs 420-1 and 420-2 may supply voltage signals to modulator 330-1, and DACs 420-3 and 420-4 may supply voltage signals to modulator 330-2. In some implementations modulators 330 may provide outputs to optical multiplexer 216. In some implementations, the outputs of modulators 330 may include the test tones.

While particular elements of optical transmitter 212 are shown in FIG. 4, in practice, the example implementations of optical transmitter 212, shown in FIG. 4, may include additional elements, fewer elements, or differently arranged elements than are shown in FIG. 3. Further, some components described as being part of optical transmitter 212 may be implemented in some other component of Tx module 210.

Figure 5:
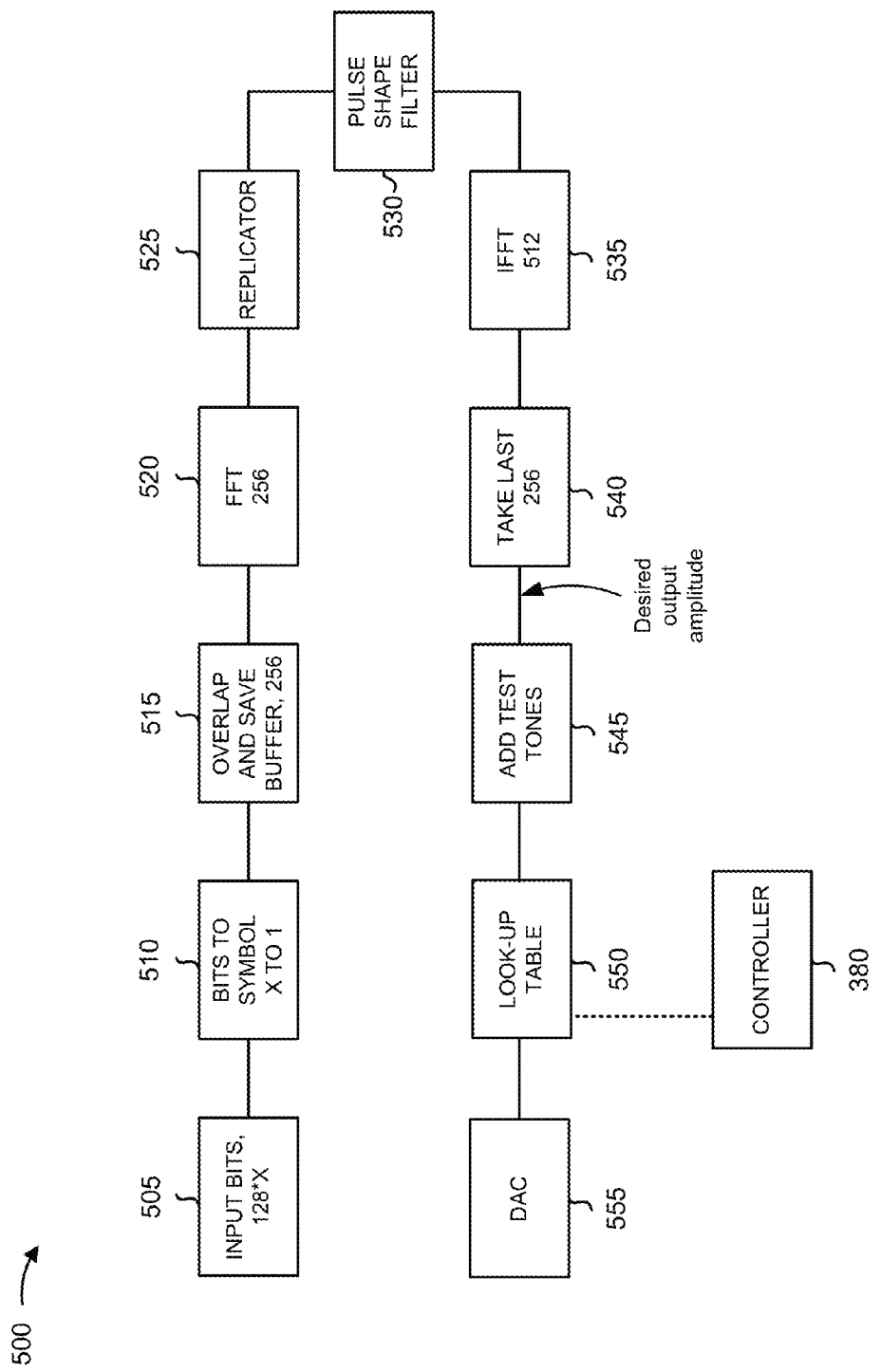
FIG. 5 is a diagram illustrating functional components of a digital signal processor.

FIG. 5 is a diagram illustrating example functional components of DSP ASIC 310. The particular functional components, which may be included in DSP ASIC 310, may vary based on desired performance characteristics and/or computational complexity.

As shown in FIG. 5, DSP ASIC 310 may include an input bits component 505, a bits to symbol component 510, an overlap and save buffer 515, a fast Fourier transfer (FFT) component 520, a replicator component 525, a pulse shape filter 530, an inverse FFT (IFFT) component 535, a take last component 540, an add test tones component 545, a look-up table component 550, and a DAC component 555.

Input bits component 505 may process 128*X bits at a time of the input data, where X is an integer. For dual-polarization Quadrature Phase Shift Keying (QPSK), X would be four. Bits to symbol component 510 may map the bits to symbols on the complex plane. For example, bits to symbol component 510 may map four bits to a symbol in the dual-polarization QPSK constellation. Overlap and save buffer 515 may buffer 256 symbols. Overlap and save buffer 515 may receive 128 symbols at a time from bits to symbol component 510. Thus, overlap and save buffer 515 may combine 128 new symbols, from bits to symbol component 510, with the previous 128 symbols received from bits to symbol component 510.

FFT component 520 may receive 256 symbols from overlap and save buffer 515, and may convert the symbols to the frequency domain using, for example, a fast Fourier transform (FFT). FFT component 520 may form 256 frequency bins as a result of performing the FFT. Replicator component 525 may replicate the 256 frequency bins to form 512 frequency bins. This replication may increase the sample rate.

Pulse shape filter 530 may apply a pulse shaping filter to the 512 frequency bins. The purpose of pulse shape filter 530 is to calculate the transitions between the symbols and the desired spectrum so that channels can be packed together on a superchannel. Pulse shape filter 530 may also be used to introduce timing skew between the channels to correct for timing skew induced by link 230.

IFFT component 535 may receive the 512 frequency bins and return the signal back to the time domain, which may now be at the operating speed of DAC component 555. IFFT component 535 may convert the signal to the time domain using, for example, an inverse fast Fourier transform (IFFT). Take last 256 component 540 may select the last 256 samples from IFFT component 535.

Add test tones component 545 may increase and/or decrease a desired output amplitude. For example, add test tones component 545 may define a first range of desired output amplitudes associated with a first test tone, a second range of desired output amplitudes associated with a second test tone, and so forth, for a set of test tones. Add test tones component 545 may periodically increase and/or decrease the desired output amplitude associated with the first voltage range at a first test tone frequency, may periodically increase and/or decrease the desired output amplitude associated with the second voltage range at a second test tone frequency, and so forth, for the set of test tones.

Look-up table 550 may include a table that identifies the integers to supply to DAC component 555 based on the samples from take last 256 component 540. In one example implementation, look-up table 545 may include electrical field values and associated voltage signals. Look-up table 550 may use the samples to identify and output the appropriate integers. DAC component 555 may generate voltage signals based on the integers provided by look-up table component 550.

Controller 380 may have access to look-up table component 550. Controller 380 may receive response information (e.g., from tone detector 370). The response information may identify how the optical power (e.g., generated by modulator 330) responds to the set of test tones. Based on the response information, controller 380 may modify integers associated with look-up table component 550. In some implementations, controller 380 may be implemented as part of DSP ASIC 310. Additionally, or alternatively, controller 380 may be implemented as a component separate from DSP ASIC 310.

While FIG. 5 shows DSP ASIC 310 as including a particular quantity and arrangement of functional components, in some implementations, DSP ASIC 310 may include additional functional components, fewer functional components, different functional components, or differently arranged functional components.

Figure 6A:
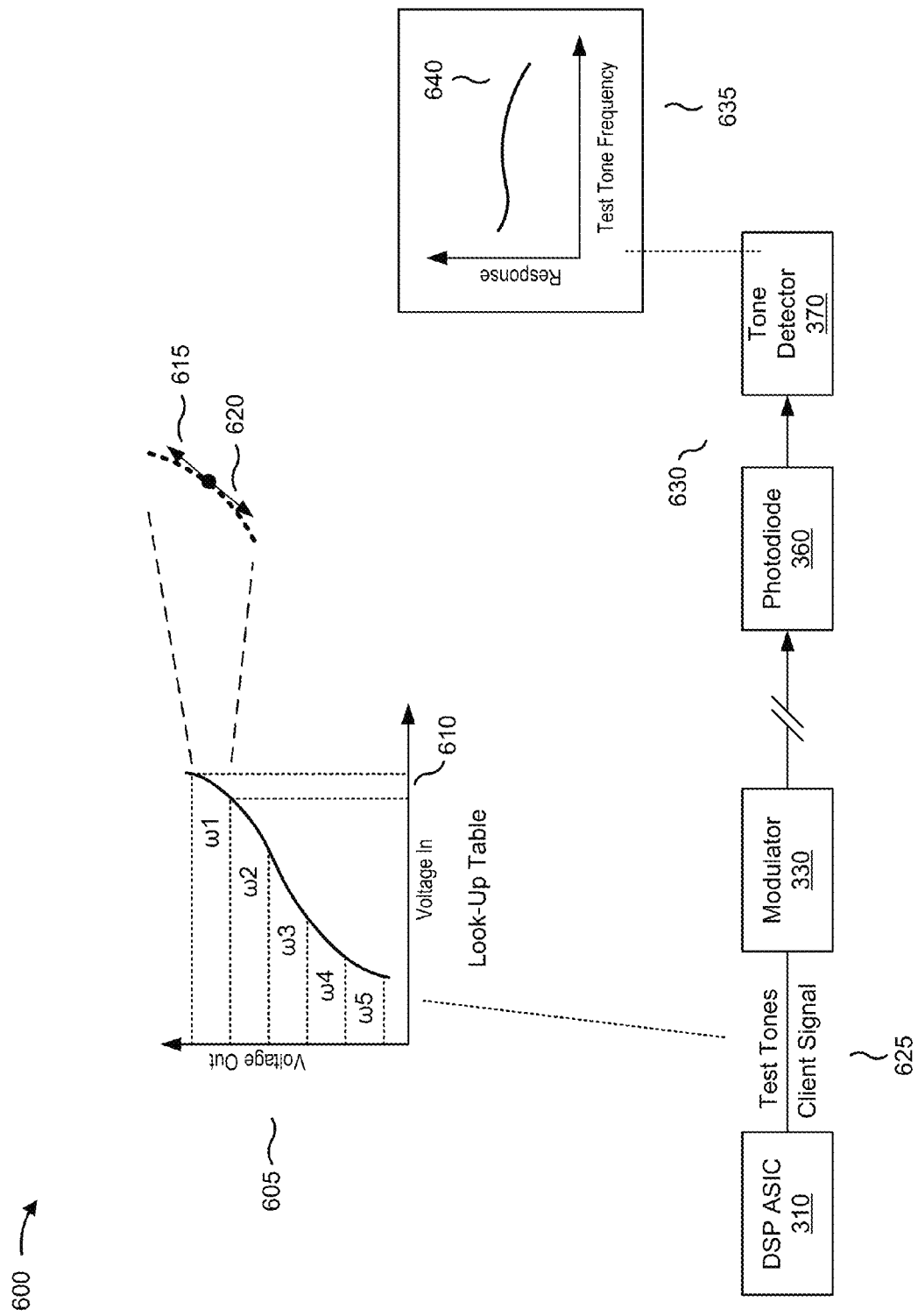
FIGS. 6A-6B are diagrams illustrating an example implementation described herein.
Figure 6B:
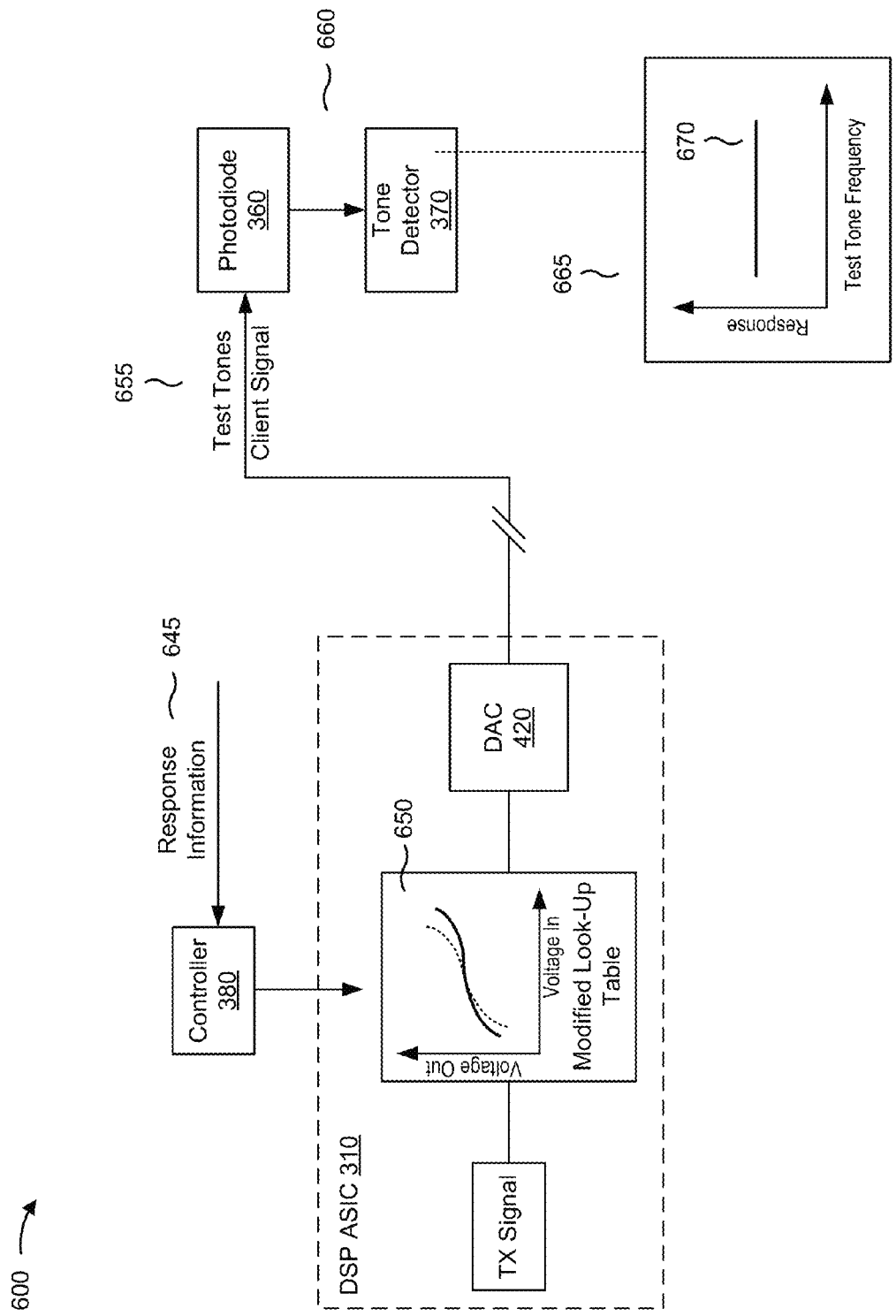

FIGS. 6A-6B are diagrams illustrating an example implementation 600 described herein. As shown in example implementation 600, DSP ASIC 310 may generate a set of test tones, and may modify a look-up table based on a response to the test tones.

As shown in FIG. 6A, and by reference number 605, DSP ASIC 310 may generate a set of test tones based on desired output amplitudes (e.g., associated with DSP ASIC 310). To generate the test tones, DSP ASIC 310 may determine a first desired output range (e.g., 2 volts to 2.5 volts) associated with a first test tone (e.g., ω1), a second desired output range (e.g., 1.5 volts to 2 volts) associated with a second test tone (e.g., ω2), a third desired output range (e.g., 1 volt to 1.5 volts) associated with a third test tone (e.g., ω3), a fourth desired output range (e.g., 0.5 volts to 1 volt) associated with a fourth test tone (e.g., ω4), a fifth desired output range (e.g., 0 volts to 0.5 volts) associated with a fifth test tone (e.g., ω5), and so on.

As shown by reference number 610, the first desired output range may correspond to a first input range (e.g., a range of input voltages for which output voltages lie within the first output range). DSP ASIC 310 may generate the desired output amplitudes based on representation of the client signal. As shown by reference number 615, DSP ASIC 310 may increase any desired output amplitudes whose values are within the first desired output range by a first voltage (e.g., 0.1 volts) for a first period of time (e.g., 0.5 milliseconds). During the first period of time, DSP ASIC 310 may apply a lookup table, and may provide an output voltage (e.g., to DAC 420) that is greater than the output voltage normally provided by the look-up table (e.g., by 0.1 volts, scaled by a slope of the lookup table).

As shown by reference number 620, DSP ASIC 310 may decrease any desired output amplitudes whose values are within the first desired output range by the first voltage (e.g. 0.1 volts) for a second period of time (e.g., 0.5 milliseconds). During the second period of time, DSP ASIC 310 may apply the lookup table, and may provide an output voltage that is less than the output voltage normally provided by the look-up table (e.g. by 0.1 volts, scaled by the slope of the lookup table). DSP ASIC 310 may increase any desired output amplitudes whose values are within the first desired output range by the first voltage for a third period of time (e.g. 0.5 milliseconds), may decrease any desired output amplitudes whose values are within the first desired output range by the first voltage for a fourth period of time (e.g., 0.5 milliseconds), and so forth. In this manner, DSP ASIC may generate the first test tone by periodically increasing and decreasing the first desired output range at a first frequency (e.g., 1 cycle per 1 millisecond).

Likewise, DSP ASIC 310 may generate the second test tone by periodically increasing and decreasing any desired output amplitudes whose values are within the second desired output range at a second frequency (e.g., 1 cycle per 1.1 millisecond), may generate the third test tone by periodically increasing and decreasing any desired output amplitudes whose values are within the third desired output range at a third frequency (e.g., 1 cycle per 1.2 milliseconds), may generate the fourth test tone by periodically increasing and decreasing any desired output amplitudes whose values are within the fourth desired output range at a fourth frequency (e.g., 1 cycle per 1.3 milliseconds), may generate the fifth test tone by periodically increasing and decreasing any desired output amplitudes whose values are within the fifth desired output range at a fifth frequency (e.g., 1 cycle per 1.4 milliseconds), and so on.

As shown by reference number 625, DSP ASIC 310 may provide the client signal and associated test tones to modulator 330 in the form of voltage signals. Modulator 330 may modulate the intensity and phase of an input optical light based on voltage signals received from DSP ASIC 310 (e.g., received from DAC 420). As shown by reference number 630, photodiode 360 may convert an optical signal (e.g. associated with the client signal and the test tones) into a digital signal, and tone detector 370 may detect the set of test tones associated with the optical signal. Based on detecting the test tones, tone detector 370 may measure an amount of optical power generated by modulator 330 in response to the set of test tones.

As shown by reference number 635, tone detector 370 may measure the optical power generated by modulator 330 (e.g., a response) as a function of test tone frequency. Based on measuring the optical power, tone detector 370 may determine to what extent the optical power increases when the output ranges (e.g., associated with the set of test tones) are increased, and to what extent the optical power decreases when the output ranges are decreased. As shown by reference number 640, tone detector 370 may detect that as the test tone frequency increases, the optical power decreases, indicating that the look-up table does not fully correct for the nonlinear output of modulator 330.

As shown in FIG. 6B, and by reference number 645, controller 380 may receive response information (e.g., from tone detector 370). The response information may identify how the optical power generated by modulator 330 responds to the set of test tones. As shown by reference number 650, controller 380 may modify the look-up table based on the response information. To modify the look-up table, controller 380 may increase values associated with the look-up table where the optical power generated by modulator 330 is low (e.g., less than an optical power output associated with a linear response), and may decrease values associated with the look-up table where the optical power is high (e.g., greater than an optical power associated with a linear response).

As shown by reference number 655, DSP ASIC 310 may generate a modified set of test tones based on the modified look-up table. As shown by reference number 660, photodiode 360 may convert the optical signal (associated with the client signal and the modified test tones) into a digital signal, and tone detector 370 may detect the set of modified test tones associated with the optical signal.

As shown by reference number 665, tone detector 370 may measure the optical power generated by modulator 330 (e.g., a response) as a function of test tone frequency. As shown by reference number 670, tone detector 370 may determine that as the modified test tone frequency increases, the response remains constant (e.g., that the response is linear). In this manner, DSP ASIC 310 may use the set of test tones to modify the look-up table to produce a linear response of modulator 330.

While FIGS. 6A-6B shows a particular quantity and arrangement of components, additional components, fewer components, different components, or differently arranged components may be provided. Also, in some instances, one of the devices illustrated in FIGS. 6A-6B may perform a function described herein as being performed by another one of the devices illustrated in FIGS. 6A-6B.

Figure 7:
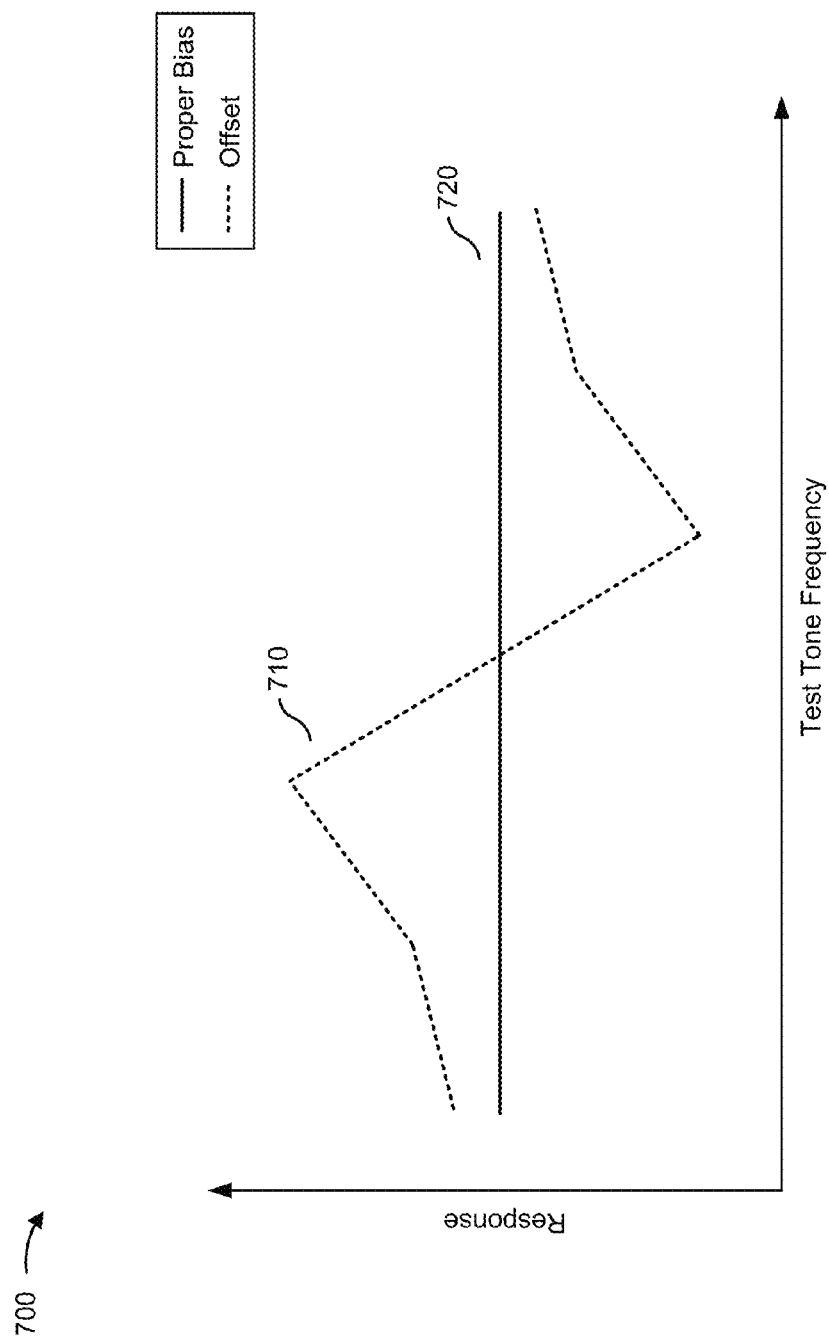
FIG. 7 is a graph illustrating an example of an offset detected by the use of a test tone.

FIG. 7 is a graph illustrating an example of an offset detected by the use of a set of test tones, for a case where a DSP output voltage (e.g., a voltage output from DSP ASIC 310) is applied to a null-biased modulator 330 (e.g., a null-biased MZM), and the phase of the MZM is shifted from its optimal null bias. The offset may include an optical signal output by modulator 330 when there is no input voltage (e.g., when the input voltage is 0). As shown by reference number 710, tone detector 370 may determine the offset by measuring the optical power generated by modulator 330 as a function of a set of frequencies associated with a set of test tones (e.g., generated by DSP ASIC 310 based on a look-up table). As shown by reference number 720, DSP ASIC 310 may correct for the offset by modifying the look-up table such that the response is constant for the set of test tone frequencies. Additionally, or alternatively, controller 380 may correct for the offset by adjusting a phase of the MZM (e.g., by applying a voltage to a phase control within the MZM).

Figure 8:
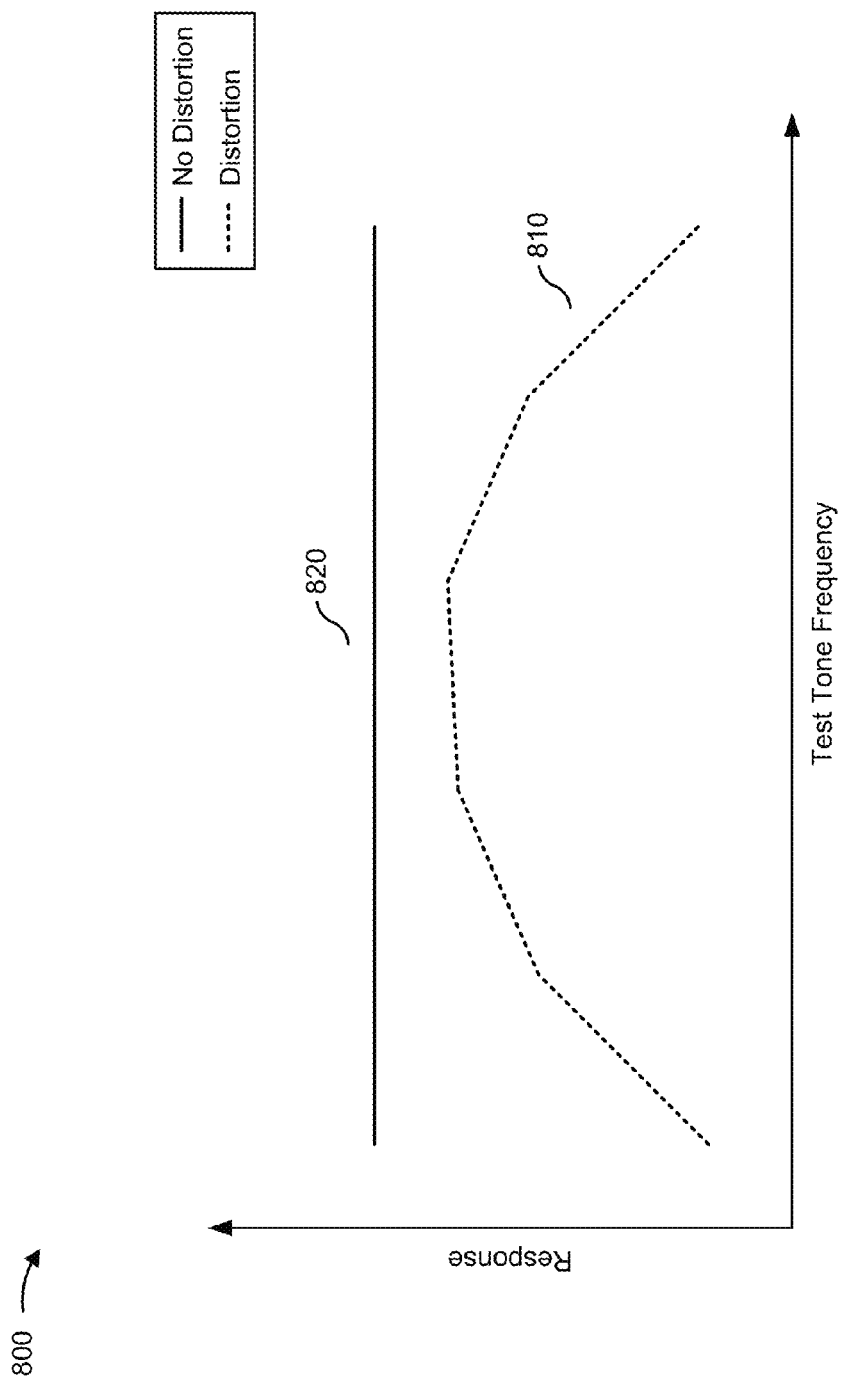
FIG. 8 is a graph illustrating an example of distortion detected by the use of a test tone.

FIG. 8 is a graph illustrating an example of distortion detected by the use of a set of test tones. The distortion may result from a distortion introduced by modulator 330 (e.g., an MZM), where an output electric field grows as the sine of the voltage applied. As shown by reference number 810, tone detector 370 may determine the distortion by measuring the optical power generated by modulator 330 as a function of a set of amplitudes associated with a test tone. The distortion may result from a decreasing voltage difference between a maximum and a minimum output signal power of modulator 330, causing an RF signal associated with modulator 330 to become saturated. As shown by reference number 820, DSP ASIC 310 may modify the look-up table associated with DSP ASIC 310 to substantially eliminate the distortion.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system, comprising:
   an optical transmitter including:
   a digital signal processor (DSP) configured to:
   receive a signal channel,
   determine a digital signal associated with the signal channel based on information in a look-up table and based on a test tone, and
   output the digital signal;
   a digital-to-analog converter (DAC) configured to convert the digital signal to an analog signal;
   a laser configured to provide an optical signal; and
   a modulator configured to:
   receive the optical signal and the analog signal, and
   modulate the optical signal based on the analog signal to form a modulated optical signal;
   a photodiode unit configured to convert the modulated optical signal to a photodiode unit output signal;
   a tone detector configured to detect the test tone based on the photodiode unit output signal; and
   a controller configured to modify the information in the look-up table based on the test tone.

2. The optical system in accordance with claim 1, where the controller is configured to:
   receive, from the detector, response information associated with the test tone,
   the response information indicating how the modulated optical signal changes in response to the test tone; and
   modify the information in the look-up table based on the response information.

3. The optical system in accordance with claim 1, where the DSP is further configured to:
   determine an output signal based on modifying the signal channel according to a value of the look-up table; and
   determine the photodiode unit output signal by modifying the output signal based on the test tone.

4. The optical system in accordance with claim 1, where the photodiode unit output signal is associated with one of a plurality of polarizations.

5. The optical system in accordance with claim 1, where the DSP is further configured to:
   determine a voltage range associated with an output of the look-up table; and
   determine the test tone based on the voltage range.

6. The optical system in accordance with claim 1, where the modulator is a Mach-Zehnder modulator (MZM).

7. The optical system in accordance with claim 1, where the DSP is further configured to:
   determine an output voltage based on the information in the look-up table,
   the output voltage depending on an integer associated with the look-up table; and
   determine the photodiode unit output signal by at least one of:
   increasing the output voltage based on the test tone, or
   decreasing the output voltage based on the test tone.

8. An optical system, comprising:
   an optical transmitter including:
   a digital signal processor (DSP) configured to:
   receive a signal channel,
   determine an output voltage, associated with the signal channel, based on information in a look-up table,
   determine a first digital signal by modifying the output voltage based on a test tone, and
   output the first digital signal;
   a digital-to-analog converter (DAC) configured to convert the first digital signal to an analog signal;
   a laser configured to provide an optical signal; and
   a modulator configured to:
   receive the optical signal and the analog signal, and
   modulate the optical signal based on the analog signal to form a modulated optical signal;
   a photodiode unit configured to convert the modulated optical signal to a second digital signal;
   a tone detector configured to detect the test tone based on the second digital signal; and
   a controller configured to modify the look-up table based on the test tone.

9. The optical system in accordance with claim 8, where the DSP is further configured to:
   modify the output voltage by increasing the output voltage based on the test tone.

10. The optical system in accordance with claim 9, where the DSP and the DAC are associated as part of an application-specific integrated circuit (ASIC).

11. The optical system in accordance with claim 8, where output voltage is a first output voltage, the test tone is a first test tone, the analog signal is a first analog signal, the modulated optical signal is a first modulated optical signal,
   the DSP being further configured to:
   determine a second output voltage based on modifying the look-up table,
   determine a third digital signal by modifying the second output voltage based on a second test tone, and
   output the third digital signal;
   the DAC being further configured to convert the third digital signal to a second analog signal;
   the modulator being configured to modulate the optical signal based on the second analog signal to form a second modulated optical signal;
   the photodiode being further configured to convert the second modulated optical signal to a fourth digital signal;
   the tone detector being further configured to detect the second test tone based on the fourth digital signal; and
   the controller being further configured to further modify the look-up table based on the second test tone.

12. The optical system in accordance with claim 8, where the tone detector is further configured to:
   detect an offset associated with the modulator.

13. The optical system in accordance with claim 8, where the tone detector is further configured to:
   detect a distortion associated with the modulator.

14. The optical system in accordance with claim 8, where the test tone is one of a plurality of test tones.

15. An optical system, comprising:
an optical transmitter including:
a digital signal processor (DSP) configured to:
receive a client signal,
determine a first digital signal associated with the client signal based on a look-up table and based on a test tone, and
output the first digital signal;
a digital-to-analog converter (DAC) configured to convert the first digital signal to an analog signal;
a laser configured to provide an optical signal; and
a Mach-Zehnder modulator (MZM) configured to:
receive the optical signal and the analog signal, and
modulate the optical signal based on the analog signal to form a modulated optical signal,
the modulated optical signal being a nonlinear signal;
a photodiode unit configured to convert the modulated optical signal to a second digital signal;
a tone detector configured to detect the test tone based on the second digital signal; and
a controller configured to modify the look-up table, based on the test tone, to cause the modulated optical signal, output by the MZM, to be a substantially linear signal.

16. The optical system in accordance with claim 15, where the controller is further configured to modify the look-up table to correct for distortion associated with the MZM.

17. The optical system in accordance with claim 15, where the controller is further configured to modify the look-up table to correct for an offset associated with the MZM.

18. The optical system in accordance with claim 15, where the DSP, when determining the first digital signal, is configured to alternate between a first input signal and a second input signal,
the first input signal and the second input signal being input into the DAC,
the first input signal being greater than the second input signal.

19. The optical system in accordance with claim 18, where the DSP, when alternating between the first input signal and the second input signal is configured to alternate at a frequency associated with the test tone.

20. The optical system in accordance with claim 19, where the test tone is one of a plurality of test tones, where the frequency is one of a plurality of frequencies, and where each frequency, of the plurality of frequencies, differs from each other frequency of the plurality of frequencies.

* * * * *